E. Campbell,
Filter,
Nº 4,240.    Patented Oct. 25, 1845.
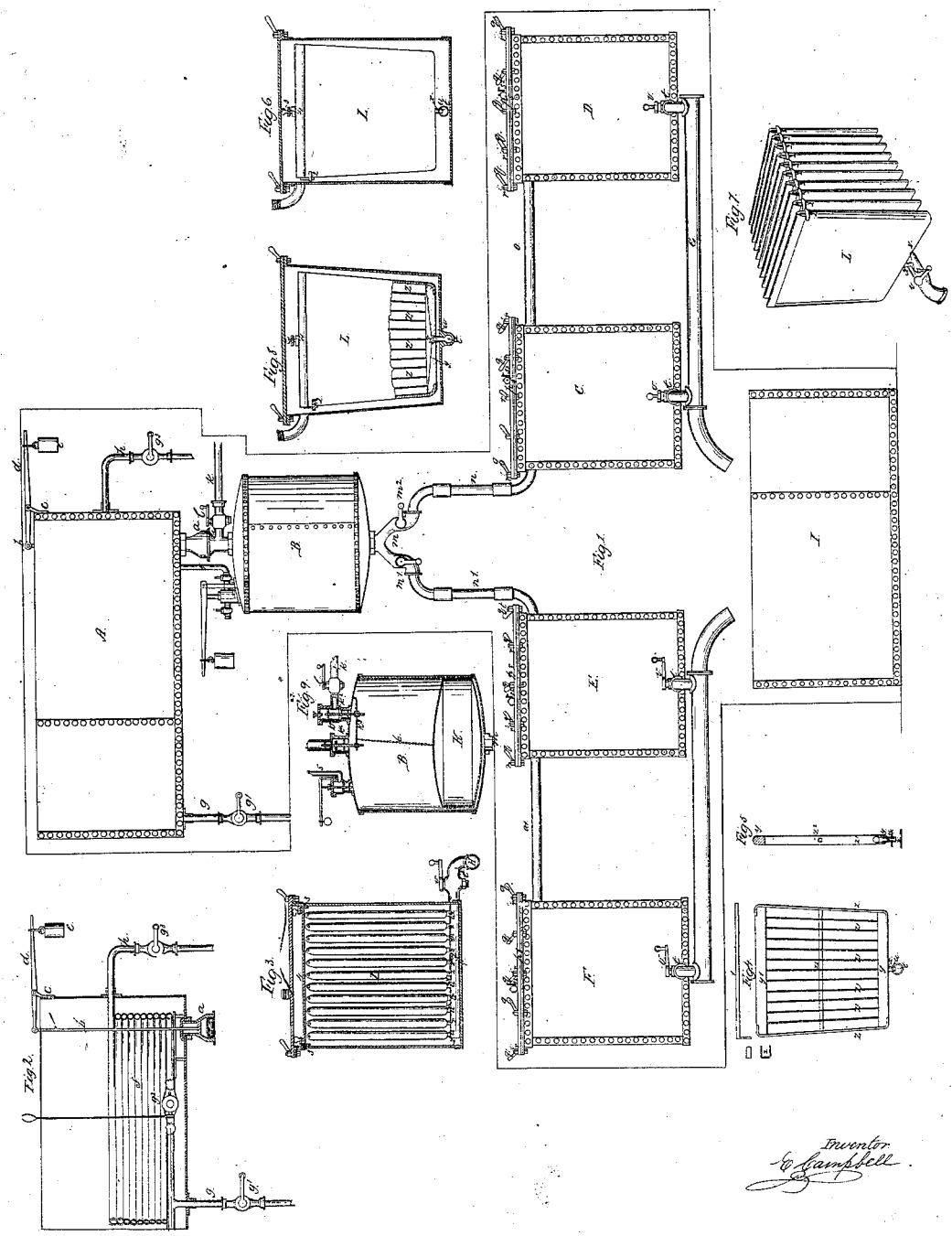
Inventor
E. Campbell.

UNITED STATES PATENT OFFICE.

ETHAN CAMPBELL, OF NEW YORK, N. Y.

SUGAR-MAKING.

Specification of Letters Patent No. 4,240, dated October 25, 1845.

*To all whom it may concern:*

Be it known that I, ETHAN CAMPBELL, of the city, county, and State of New York, philosophical engineer, have invented and made and applied to use certain new and useful improvements in the mechanical means of filtering and purifying the juice of sugar-canes or the juice of beet-roots or of other vegetable substances containing saccharine matter and of filtering and purifying any solution of cyrstallizable substances previous to evaporating the same into syrup or crystallizing or granulating the same into sugar or producing the crystals of any vegetable or mineral substances, which improved means are equally available in the process of converting raw sugar of any kind into refined sugar and of filtering and purifying vegetable or animal oils or unctuous matter, and for which improved mechanical means and the application hereof to any purposes for which it is available I seek Letters Patent of the United States, and that the said improved means and the mode of constructing and using the same are fully and substantially shown and set forth in the following description and in the drawings annexed to and making a part of this specification, wherein—

The principal Figure 1 is a general collective representation of the apparatus as invented and arranged by me shown as in use; the detached figures are separately referred to, and the same letters and numbers, as marks of reference, apply to the same parts in all the several figures.

A, is an open vessel of any convenient form or size, or material, which in refining raw sugar, is technically termed the "blow up" or heater, and in my processes, may either receive water that is saturated with raw sugar for refining, or it may receive cane juice. But root juice, or other vegetable and saccharine juices, according to the kind of juice it may be intended to filter for sugar, or any liquor, containing in solution crystallizable vegetable or mineral substances, or vegetable or animal oils, or unctuous matter; these are to be supplied in any convenient manner, from a tank or reservoir into the "blow up" or heater, where the solution, or liquid, or other matter under treatment, is to be kept in motion, by agitators or stirrers, of any convenient form, until the mass under treatment is brought up to a proper heat by steam, which is to be admitted by the cock $g$, unto the steam pipes $f$, formed in a coil within the vessel A, and in boiling a solution of raw sugar for refining, or any other article requiring steam to enter into it the steam is to be admitted into the vessel and liquid by the cock $g^2$, see Fig. 2. The steam being prevented going through the eduction pipe $h$, by closing the cock $g^3$.

In treating unconverted vegetable saccharine juices, or other articles, not requiring steam to enter them, the cock $g^2$, is to be closed, and the cock $g^3$, is to be opened, and the articles are to be heated, by the current of steam through the pipes $f$, passing by the cock $g^3$, and pipe $h$, to any convenient receiver of the water of condensation. At one end of the vessel A is an exit valve $a$, opening downward held by the rod $b$, jointed to the steelyard lever $d$, whose fulcrum is on the standard $c$. A shifting counter weight $e$, is on the lever $d$, to regulate the valve $a$, or a cock may be used, instead of a valve. The fittings of this portion of the apparatus are shown in section in the detached Fig. 2. Beneath the valve $a$, is the connecting pipe $i$, and branch steam pipe $k$, with a stop cock $l$. These and the valve $a$, open into the intermediate cylinder B. This is shown fitted with a small common safety valve with a graduated lever by which any internal pressure beyond that actually required from the steam will be allowed to pass off and may escape into the atmosphere or may be taken by the pipe 5 into the liquor in the heater A, as shown in the principal figure. This arrangement may be available in filtering goods that require watching so as to govern the supply from the blow up to the cylinder B, by hand with the valve $a$, and cock $l$. But where it is wished to maintain a continuous supply of hot liquor from the "blow up" the mode of fitting the interior of the cylinder B shown sectionally in the detached Fig. 9, will be best to use. In this $l$, is the steam cock and $k$ the steam pipe as before but the pipe $k$ opens into a separate steam valve box $k'$ with a steam valve $k^2$ opening upward the stem of which is adjustable by nuts at the lower end above and below is the cross lever $k^3$. This is jointed at one end to the inside of the top of the cylinder B. The moving end of this lever carries a similarly adjusted spindle of the valve $k^4$ which opens downward from the "blow up" and the chain 6 connects the lever $k^4$ to a buoy float $k$ placed within the cylinder B the parts being so adjusted that when the cylinder is nearly empty as shown in Fig. 9, the weight of the buoy float $k$ tightening the chain 6 by its weight pulls down and shuts the steam valve $k^2$, and opens the supply valve $k^4$ downward to admit a fresh supply of liquor from the "blow up" above and on this supply nearly filling the cylinder B the buoy rising shuts the supply valve $k^4$ and opens the steam valve $k^2$, the pressure of steam now admitted forces the valve $k^4$ upward against the supply from the blow up and accelerates the exit of the liquor by the pressure on the upper face of the buoy beneath which at the bottom of the cylinder B, is a forked branch pipe $m$, having in its legs, the liquor cocks or valves $m^1$, $m^2$; next below these the descending pipe $n$, on the right of the figure leads into a filter box C, and this is connected by the pipe $o$, to a second filter box D. On the left of the figure, the second descending pipe $n'$, leads into the third filter box E, and this is connected by the pipe $o'$, to the fourth filter box F. These boxes may be made of wood, but it is preferable to make them of metal, as they are represented in the drawing. On the top of each filter box is a flanch $s$, through which the bolts $r$, $r$, are screwed to secure the covers $p$, $p$, these must have a small air escape cock $s^2$ on the top, and be made to fit or be packed, air and water tight, on the flanches, but to remove them easily, for purposes, hereafter stated, they are to be secured by wrench handled or butterfly nuts $q$, $q$, $q$, or by a slide passing through staples or slots in the tops of the bolts, or by any other convenient mode.

At the bottom of each filter box are shown the exit pipes $t$, $t$, each fitted with an exit cock $v$, $v$, opening into the leader pipes G or H. These empty into the receiving tank, I, whence the filtered liquor, juice, or syrup, may be taken to a boiler, for reduction, by evaporation into sugar, or into crystals of the matter held in solution in the liquor, when the apparatus is used for filtering such liquids. In the detached Fig. 8, the exit pipes $t$, $t$, are shown, as made under the boxes, instead of within them, and this mode may be generally the best in practice, as it allows the filter box to empty more completely, when in work, and the sediments and filth, left in the bottom, can be more easily run off, and cleaned out. The frames or leaves L, that are the portions of this apparatus by which the filtration is effected are shown sectionally and endwise, collectively in place, for use in the detached Fig. 3.

The detached Fig. 4 is a vertical elevation of the frame and Fig. 5, a corresponding cross section thereof. Fig. 6, is a sectional lengthwise elevation, in place, and Fig. 7, is a perspective representation of a set of frames, or leaves, with the exit pipe $t$, and cock $v$, in place for use, as they would appear without the filter boxes. In these filter leaves or frames L, the lower frame piece $y$, has a groove in the middle of the upper side, finishing centrally in the exit thimbles $x$, these when in place for use, enter the exit nozzles $u$, $u$, in the pipes $t$, the frames or leaves L, standing at right angles with the pipes $t$, the top frame piece $y'$, also of wood, is strongly connected to the lower frame piece $y$, by end pieces of sheet metal or of wood, if of metal these are made convex outward and turned over, and screwed on the ends of the pieces $y$, $y'$, and the intermediary bars $z'$, are secured in at the top end by a single tenon and at the bottom end by a double tenon with an opening between them so as to pass the fluid and not to enter the groove in the bottom frame piece $y$. A connecting bar $z^2$, sets and strengthens the frame, and when thus made, and wanted for use, a bag of heavy double twilled cotton duck cloth, with a hole at the bottom neatly bound to fit and pass the thimble $x$, and made by cutting to shape and sewing together so as to fit the frame quite tight, is to be drawn over each frame and thoroughly wetted, at the top, only, to turn over and roll tight, and being made long enough to turn over at top, is secured by rolling the surplus length round the tightening rods 1, the ends of which are prevented from turning by the end handle turning down to be held by the staple clasp 2. These are shown separate above the Fig. 4, and in place for use in the detached Figs. 3, 6, 7, and 8. These filter frames L, are herein described, as made of wood and metal, similar to those I have had in use and the bags are described as made of heavy double twilled cotton duck, because I have found, in practice, this is the best material for the intended purpose; woolen cloth, of any kind, does not answer so well, and linen, hemp, or silk bags, have not answered at all, in my practice. The filter frames L, are shown with the lower frame piece $y$ shorter than the upper frame piece $y'$, so as to allow the frame to be tapered downward as in this form, only, the bags can be easily put on, and taken off, and at the same time fit, with the required tightness over the frames. Within each filter box L, are two lugs 3, with a screw through each, and when each filter frame or leaf is in place, a binding bar 4, is placed under the lugs and then screwed down, by this, the thimbles $x$, $x$, are forced into the nozzles $u$, $u$, and the leaves are held firmly in place, as shown in the detached Fig. 3, a better mode, however, is to fasten the keeper bar 4, under the cover, with expansive segmental springs beneath, and occupying the space, between the tops of the filter frames, and the underside of the filter box cover, so that when the cover is screwed down, the act of doing that, fixes the filter leaves in place, as required.

The tops or covers $p, p$, are to be packed and fastened down, air and steam tight, by the nuts $q, q$, and when thus fitted, the apparatus is to be used as follows. The blow up or heater A, is to be fitted with the solution, or article intended for filtration. If this is a solution of raw sugar for refining the cocks $g'$ and $g^2$, are to be opened and the cock $g^3$, to be closed, and the solution boiled, by the admission of steam in the usual way. If juice of cane, and beet roots or any unconverted vegetable juice, containing saccharine matter, is to be treated, the cock $g^2$ is to be closed and the cocks $g'$ $g^3$, opened so that the juice shall be heated nearly to the boiling point, by the current of high pressure steam passing through the pipes $f, f$ to a point where the steam will be allowed to pass off as it condenses. In either of these operations, the proportion of saaccharine matter in the solution, or juice, is to be ascertained by a saccharometer, in the usual way, and a chemical compound, in powder, is to be mixed in the solution, or juice in the vessel. This chemical compound is to be prepared, and proportioned, in a manner, for which it is my intention to seek a separate patent, hereafter and in all cases, where these mechanical means of filtration are employed, in purifying any solution containing crystallizable matter, for the purpose of crystallizing the same, this compound is to be mixed with the solution, while boiling, and when the solution is sufficiently boiled for filtering clear, which must be indicated by chemical practice, as different articles in solution, will require different proportions of compound, and will filter, at different specific gravities; then the cock or valve $a$, in the blow up A, is to be opened, and the liquor allowed to descend, and fill the intermediate cylinder B, and filter boxes C, D, E, F, and drive out all the air through the air cock $s^2$, and fill the exit pipes $t, t$, G and H and as soon as the cylinder and filter boxes are full the liquor under filtration will begin to run through the filter bags and frames and the successive parts of the apparatus, and as soon as the stream slackens, in running off, the cock or valve $a$, is to be shut, and the steam cock $l$, in the pipe K, is to be opened, to allow the access of high pressure steam from a boiler, this steam operating on the surface of the liquor in the cylinder B, will force the liquor or syrup, or solution under filtration through the cotton bags on the filter leaves L, into the space between the bars $z'$, and it will run downward, into the groove in the frame $y$, and through the thimbles $x$, and nozzles $u$, pipes $t$, and leader pipes G or H.

The liquor generally will not come clear at the commencement. Such liquor may be received into any convenient vessel beneath, until it becomes transparent and as soon as the compound mixed with the solution begins to coat on the outer surfaces of the filter bags, the liquor will come out a clear, colorless syrup or solution of crytallizable matter, and the operation of filtering will continue, with a stream of clear liquor, which if of a saccharine solution, on being evaporated *in vacuo*, and afterward treated in any proper manner will produce a pure white refined sugar, and this result will be the same whether the syrup is formed from raw cane sugar, or from cane juice, or beet root juice, or other vegetable juices, containing saccharine matter.

When by continuous use, the filter bags, and boxes become foul, and the liquor will not run freely, the boxes are to be opened, the filter frames or leaves taken out, the boxes well washed through, and the bags be taken off the frames. These are then to be thoroughly and separately washed, and dried, and the bags and frames replaced for use as before described.

It is not my intention to confine the use of these mechanical means of filtering two solutions of crystallizable matter, but to use them, for any similar purpose to which they can be applied, as stated in the preamble to this specification neither do I intend that this arrangement shall be limited in use to filtering solutions mixed with the chemical compounds before referred to because saccharine solutions mixed with ivory black in the proportions now commonly used will filter effectively in this apparatus and the whole can be used with any other liquid, saccharine or oleaginous matter mixed with any compound that will aid in purifying the article under treatment.

I do not claim to have invented the "blow up" or heater, herein described, or any portion of the fitting pipes, cocks or valves, that most immediately and properly belong to that vessel as the whole thereof are already well known. But I do claim as new and of my own invention,—

1. The application of the intermediate cylinder or vessel B, with the connecting pipe $i$, steam pipe $k$, and steam cock $l$, for admitting steam to press on the article under treatment when applied in combination with the buoy float K, chain 6, supply valve $k^4$, and steam valve $k^2$ for the purpose of maintaining a regular and successive supply of liquor and pressure of steam thereon within the vessel B, for the purpose set forth and substantially as described and shown.

2. The application of the exit pipes $t$, $t$, and nozzles $u$, $u$ to the filter boxes C, D, E and F to receive and act in combination with the thimbles, $x$, $x$, of the filter leaves or frames L, including any merely mechanical variation in the construction of the parts that shall be substantially the same in the means employed and the effects produced.

3. The mode described of constructing the filter leaves or frames L which may be of wood alone or of wood and metal conjointly, in either case each framed together in a tapered form to allow of the bags being drawn tightly on, and easily drawn off for cleaning and the combination therewith of the groove and thimbles $x$, $x$, in the lower frame piece $y$, when such mode of construction and combination or any variations substantially the same are used for any of the purposes herein set forth.

4. The application of tapered filter bags to envelop the frames L when used in combination with the means of securing the same on the frames by the tightening rod 1, and staple clasp 2, for the purposes set forth and substantially as described and shown.

In witness whereof I the said ETHAN CAMPBELL have hereunto set my hand in the city of New York this fifth day of April in the year one thousand eight hundred and forty five.

ETHAN CAMPBELL. [L. S.]

Witnesses:
ALEXR. GARDINER,
W. SERRELL,
L. W. SERRELL.